United States Patent
Nielsen

(10) Patent No.: US 9,632,678 B2
(45) Date of Patent: Apr. 25, 2017

(54) IMAGE PROCESSING APPARATUS, IMAGE PROCESSING METHOD, AND PROGRAM

(71) Applicant: Sony Corporation, Minato-ku (JP)

(72) Inventor: Frank Nielsen, Tokyo (JP)

(73) Assignee: SONY CORPORATION, Tokyo (JP)

( * ) Notice: Subject to any disclaimer, the term of this patent is extended or adjusted under 35 U.S.C. 154(b) by 386 days.

(21) Appl. No.: 13/919,188

(22) Filed: Jun. 17, 2013

(65) Prior Publication Data

US 2014/0047367 A1 Feb. 13, 2014

(30) Foreign Application Priority Data

Aug. 9, 2012 (JP) .................. 2012-176619

(51) Int. Cl.
G06F 3/048 (2013.01)
G06F 3/0484 (2013.01)
G06T 15/20 (2011.01)
G06F 3/01 (2006.01)

(52) U.S. Cl.
CPC ......... G06F 3/04845 (2013.01); G06F 3/011 (2013.01); G06F 3/0484 (2013.01); G06T 15/20 (2013.01)

(58) Field of Classification Search
CPC .... G06F 3/04845; G06F 3/011; G06F 3/0484; G06T 15/20
USPC ...................................................... 715/767
See application file for complete search history.

(56) References Cited

U.S. PATENT DOCUMENTS

| | | | |
|---|---|---|---|
| 5,694,532 A * | 12/1997 | Carey et al. .................. 345/419 |
| 5,712,965 A * | 1/1998 | Fujita ...................... G06T 19/20 345/419 |
| 6,662,103 B1 * | 12/2003 | Skolnick ................ G01C 15/00 356/3.01 |
| 7,555,157 B2 * | 6/2009 | Davidson et al. ............ 382/154 |
| 2004/0041812 A1 * | 3/2004 | Roberts ............... G06F 17/5004 345/474 |
| 2005/0035883 A1 * | 2/2005 | Kameda et al. ........... 340/995.1 |
| 2006/0087519 A1 * | 4/2006 | Berger ..................... G06T 11/60 345/619 |
| 2006/0114252 A1 * | 6/2006 | Ramani ............. G06F 17/30277 345/419 |
| 2008/0122796 A1 * | 5/2008 | Jobs et al. ..................... 345/173 |
| 2008/0239133 A1 * | 10/2008 | Cazier et al. ............ 348/333.05 |
| 2009/0179895 A1 * | 7/2009 | Zhu et al. ...................... 345/424 |
| 2010/0302594 A1 * | 12/2010 | Chapman ................ G06T 11/60 358/1.18 |

(Continued)

FOREIGN PATENT DOCUMENTS

JP 2000-172391 6/2000

*Primary Examiner* — William Bashore
*Assistant Examiner* — Gregory A Distefano
(74) *Attorney, Agent, or Firm* — Chip Law Group

(57) ABSTRACT

An image processing apparatus includes: an acquisition section configured to acquire positional information specified by a user on an input image for specifying area selection; and out of a calculation result of a transformation matrix between an object plane being a perspective projection plane formed by an object in the input image and an isothetic plane, a selected-area calculation section configured to calculate an area in the object plane as a selected area by the user using the transformation matrix of the object plane corresponding to the positional information specified by the user.

12 Claims, 16 Drawing Sheets

(56) References Cited

U.S. PATENT DOCUMENTS

2012/0299961 A1* 11/2012 Ramkumar et al. .......... 345/632
2013/0335575 A1* 12/2013 Tsin ..................... G06T 7/0046
                                                    348/169

* cited by examiner

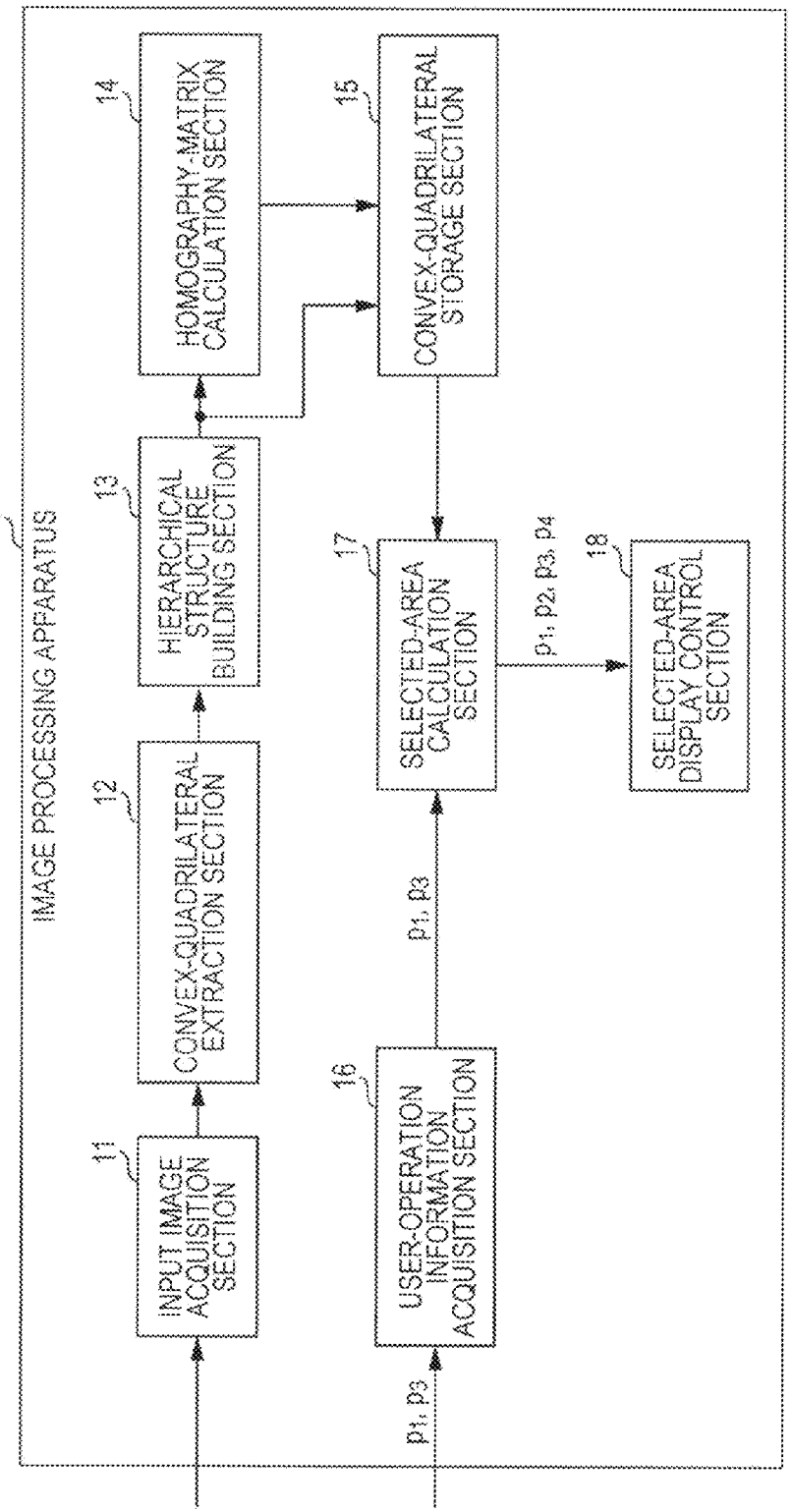

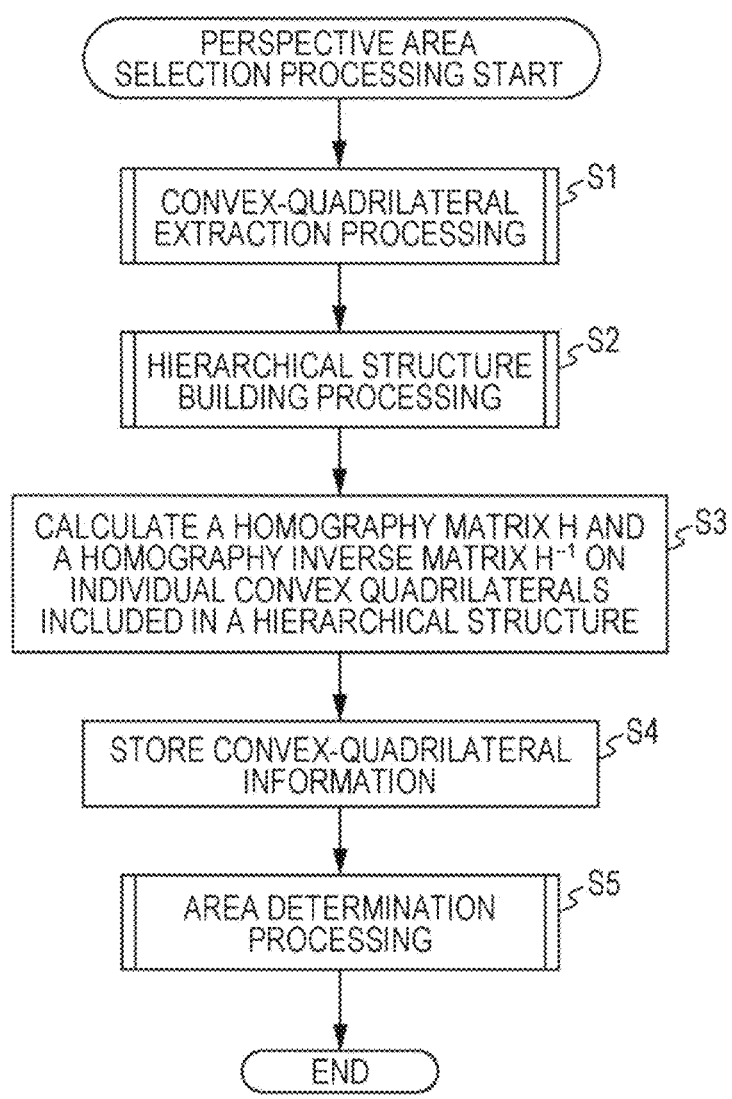

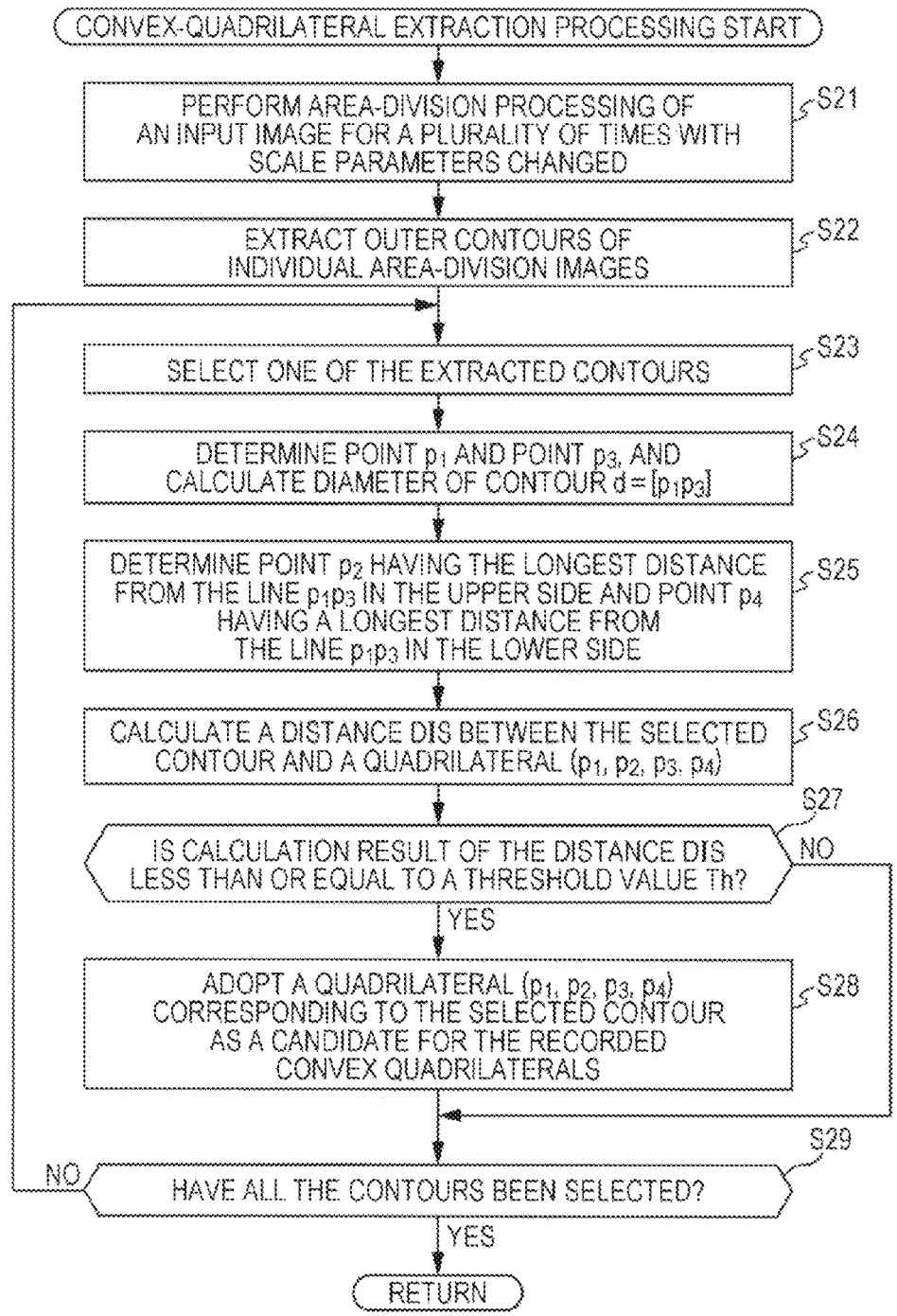

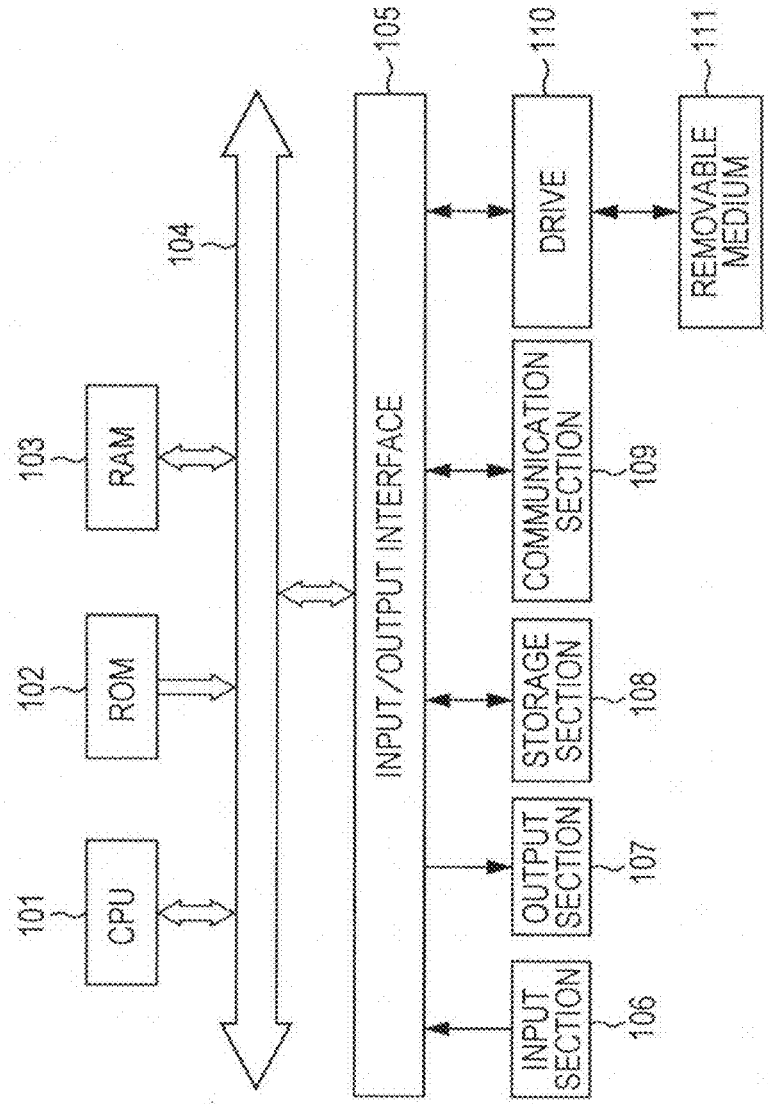

IMAGE PROCESSING APPARATUS, IMAGE PROCESSING METHOD, AND PROGRAM

BACKGROUND

The present technique relates to an image processing apparatus, an image processing method, and a program. In particular, the present technique relates to an image processing apparatus, an image processing method, and a program that provide a user with an area-specification method allowing the user to select a desired area.

In editing an image, and so on, in the case of specifying a predetermined area, a commonly-used method for a user is to specify two points by click-and-drag operation, and to determine a rectangle having the two specified points in a diagonal direction as a specified area (for example, refer to Japanese Unexamined Patent Application Publication No. 2000-172391 (paragraph 0004)).

SUMMARY

However, among images, there are a large number of images in which objects in an image are represented in perspective (in a perspective drawing), for example, in the case of a photograph of a streetscape, and so on. In such an image, a user often finds it difficult to select a desired area by specifying two points using a related-art click-and-drag method. For example, in an image illustrated in FIG. 1A, in the case of specifying an area of characters of "NEW" in a sign on which "NEWCOURT" is displayed, the specification becomes as illustrated in FIG. 1B by a related-art method so that it is difficult for the user to specify successfully an area of the characters of "NEW". That is to say, an object in the image is represented in an oblique plane in perspective, whereas the user is allowed to specify an area only using a rectangle by a related-art method all the time. Accordingly, it is difficult for the user to suitably select an area to be originally specified.

The present technique has been made in view of such circumstances. It is desirable to provide a method of specifying an area, which allows a user to suitably select a desired area.

According to an embodiment of the present disclosure, there is provided an image processing apparatus including: an acquisition section configured to acquire positional information specified by a user on an input image for specifying area selection; and out of a calculation result of a transformation matrix between an object plane being a perspective projection plane formed by an object in the input image and an isothetic plane, a selected-area calculation section configured to calculate an area in the object plane as a selected area by the user using the transformation matrix of the object plane corresponding to the positional information specified by the user.

According to an embodiment of the present disclosure, there is provided a method of processing an image, the method including: acquiring positional information specified by a user on an input image for specifying area selection; and out of a calculation result of a transformation matrix between an object plane being a perspective projection plane formed by an object in the input image and an isothetic plane, calculating an area in the object plane as a selected area by the user using the transformation matrix of the object plane corresponding to the positional information specified by the user.

According to an embodiment of the present disclosure, there is provided a program for causing a computer to perform processing including: acquiring positional information specified by a user on an input image for specifying area selection; and out of a calculation result of a transformation matrix between an object plane being a perspective projection plane formed by an object in the input image and an isothetic plane, calculating an area in the object plane as a selected area by the user using the transformation matrix of the object plane corresponding to the positional information specified by the user.

In an embodiment of the present technique, positional information specified by a user on an input image for specifying area selection is acquired; and out of a calculation result of a transformation matrix between an object plane being a perspective projection plane formed by an object in the input image and an isothetic plane, an area in the object plane is calculated as a selected area by the user using the object plane corresponding to the positional information specified by the user.

In this regard, it is possible to provide the program by transmitting it through a transmission medium, or to provide it by recording the program on a recording medium.

The image processing apparatus may be an independent apparatus, or may be an internal block included in one apparatus.

By an embodiment of the present technique, it is possible to provide a method of specifying an area, which allows a user to suitably select a desired area.

BRIEF DESCRIPTION OF THE DRAWINGS

FIG. 2 is a block diagram illustrating an example of a configuration of an image processing apparatus according to an embodiment, to which the present technique is applied;

FIG. 4 is a flowchart illustrating perspective area selection processing by the image processing apparatus in FIG. 2;

FIG. 5 is a flowchart illustrating details of convex-quadrilateral extraction processing executed as step S1 in FIG. 4;

FIG. 17 is a block diagram illustrating an example of a configuration of a computer according to an embodiment, to which the present technique is applied.

DETAILED DESCRIPTION OF EMBODIMENTS

Figure 1A:
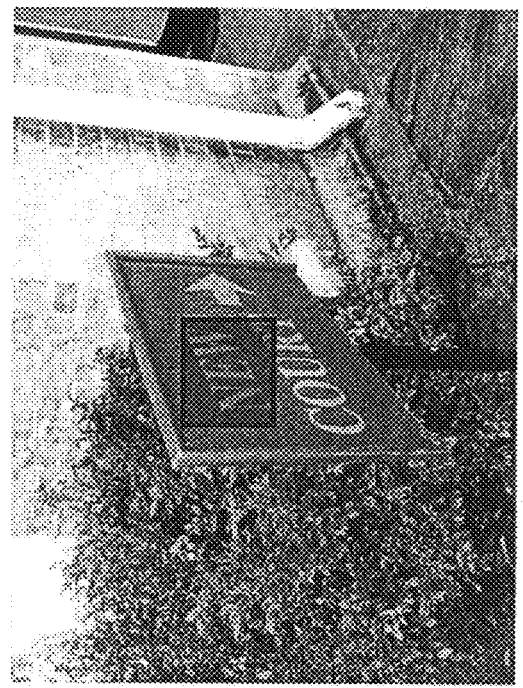
FIGS. 1A and 1B are explanatory diagrams of a related-art method of selecting an area.
Figure 1B:

Example of Configuration of Image Processing Apparatus

FIG. 2 is a block diagram illustrating an example of a configuration of an image processing apparatus according to an embodiment, to which the present technique is applied.

The image processing apparatus 1 includes an input image acquisition section 11, a convex-quadrilateral extraction section 12, a hierarchical structure building section 13, a homography matrix calculation section 14, a convex-quadrilateral storage section 15, a user-operation information acquisition section 16, a selected-area calculation section 17, and a selected-area display control section 18.

Figure 3:
FIG. 3 is an explanatory diagram of an example of area selection by the image processing apparatus in FIG. 2.

The image processing apparatus 1 is an apparatus that provides an area-specification user interface for a user to specify an oblique area in perspective as a user-selected area on the basis of positional information of two points specified by click-and-drag operation. By the image processing apparatus 1, for example, in the case of specifying an area of characters "NEW" in a sign in the image illustrated in FIG. 1A, it is possible to suitably specify the characters "NEW" as illustrated in FIG. 3. Such a method of selecting an area, which becomes possible by the image processing apparatus 1, is referred to as an area selection in perspective (perspective area selection).

The input image acquisition section 11 acquires an input image to be edited, and supplies the input image to the convex-quadrilateral extraction section 12.

The convex-quadrilateral extraction section 12 extracts convex quadrilaterals that exist in the input image. More specifically, the convex-quadrilateral extraction section 12 searches for an object shape in the image, which can be approximated as a convex quadrilateral in the input image, and extracts an object as a convex quadrilateral. The convex quadrilateral corresponds to a plane included in the object in the input image, which is drawn in perspective (in a perspective drawing), and thus the convex-quadrilateral extraction section 12 recognizes an object plane (perspective projection plane) included in the object in the input image.

In this regard, a convex quadrilateral represents a quadrilateral whose interior angles of all the vertices are less than 180 degrees. In this regard, a quadrilateral that has a least one interior angle of a vertex, which exceeds 180 degrees, is a concave quadrilateral that is opposite to a convex quadrilateral.

The hierarchical structure building section 13 builds a hierarchical structure representing inclusion relationships (nesting structure) of all the convex quadrilaterals extracted from the input image by the convex-quadrilateral extraction section 12. Specifically, for example, in the case where in a first convex quadrilateral and a second convex quadrilateral that are extracted by the convex-quadrilateral extraction section 12, if the second convex quadrilateral is included in the first convex quadrilateral, the hierarchical structure building section 13 positions the second convex quadrilateral as a convex quadrilateral in a subordinate hierarchy of the first convex quadrilateral. The hierarchical structure building section 13 checks such inclusion relationships of all the extracted convex quadrilaterals, and builds a hierarchical structure of the convex quadrilaterals.

In this regard, if both of the first convex quadrilateral and the second convex quadrilateral that are extracted by the convex-quadrilateral extraction section 12 have a positional relationship in which only a part of both of the quadrilaterals overlap, the hierarchical structure building section 13 excludes either one of the first convex quadrilateral and the second convex quadrilateral from the convex quadrilaterals to be recorded.

The homography matrix calculation section 14 calculates a homography matrix H that performs projective transformation on each of the plurality of convex quadrilaterals whose hierarchical structure has been built by the hierarchical structure building section 13 into a unit square whose each-side length is 1, and a homography inverse matrix $H_{-1}$ that performs the inverse projective transformation.

The homography matrix is a transformation matrix when a quadrilateral in a first plane is subjected to projective transformation into a quadrilateral in a second plane different from the first plane. The homography matrix is represented by a 3×3 matrix, and if four corresponding points in the first plane and the second plane are given, it is possible to obtain the homography matrix by solving simultaneous equations of transformation expressions to which the four corresponding points are assigned.

In the present embodiment, the homography matrix calculation section 14 calculates the homography matrix H and the inverse matrix $H^{-1}$ thereof on the assumption that a quadrilateral in the first plane is a convex quadrilateral detected from the input image, and the quadrilateral in the second plane is a unit square in the same plane as the input image.

The homography matrix H is represented by the following expression.

$$H = \begin{bmatrix} h_{11} & h_{12} & h_{13} \\ h_{21} & h_{22} & h_{23} \\ h_{31} & h_{32} & h_{33} \end{bmatrix}$$

If it is assumed that points in the second plane, which correspond to the four points $(x_1, y_1)$, $(x_2, y_2)$, $(x_3, y_3)$, and $(x_4, y_4)$ in the first plane are $(x_1', y_1')$, $(x_2', y_2')$, $(x_3', y_3')$, and $(x_4', y_4')$, the transformation expression into which the four corresponding points are assigned can be expressed as follows.

$$\begin{bmatrix} x_1 & y_1 & 1 & 0 & 0 & 0 & -x_1 x_1' & -y_1 x_1' \\ 0 & 0 & 0 & x_1 & y_1 & 1 & -x_1 y_1' & -y_1 y_1' \\ x_2 & y_2 & 1 & 0 & 0 & 0 & -x_2 x_2' & -y_2 x_2' \\ 0 & 0 & 0 & x_2 & y_2 & 1 & -x_2 y_2' & -y_2 y_2' \\ x_3 & y_3 & 1 & 0 & 0 & 0 & -x_3 x_3' & -y_3 x_3' \\ 0 & 0 & 0 & x_3 & y_3 & 1 & -x_3 y_3' & -y_3 y_3' \\ x_4 & y_4 & 1 & 0 & 0 & 0 & -x_4 x_4' & -y_4 x_4' \\ 0 & 0 & 0 & x_4 & y_4 & 1 & -x_4 y_4' & -y_4 y_4' \end{bmatrix} \times \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x_1' \\ y_1' \\ x_2' \\ y_2' \\ x_3' \\ y_3' \\ x_4' \\ y_4' \end{bmatrix}$$

On the assumption that elements of the homography matrix H excluding $h_{33}$ are h', this expression is expressed as follows.

$$B \times h' = b$$

And h' is obtained by the following expression.

$$h' = B^{-1} \times b$$

And it is possible to assume that $h_{33}=1$, and thus the homography matrix H is obtained.

The quadrilaterals produced by performing projective transformation on the convex quadrilaterals detected from the input image can be any rectangles. However, the quadrilaterals are determined to be unit squares, and thus it is possible to simplify the calculation of the homography matrix H and the inverse matrix $H^{-1}$.

The convex-quadrilateral storage section 15 stores information on the convex quadrilaterals detected from the input image. Specifically, the convex-quadrilateral storage section 15 stores individual component information of the plurality of convex quadrilaterals detected from the input image (the coordinates of the four points), the homography matrix H and the homography inverse matrix $H_{-1}$, and the hierarchical structure information of the convex quadrilaterals, which has been built by the hierarchical structure building section 13. In this regard, the convex quadrilaterals that have been excluded by the hierarchical structure building section 13 because of the overlapped positional relationship with the other convex quadrilaterals are not stored in the convex-quadrilateral storage section 15. Hereinafter the convex quadrilaterals that are stored (recorded) in the convex-quadrilateral storage section 15 are referred to as recorded convex quadrilaterals.

The user-operation information acquisition section 16 acquires information on the positions specified by the user for area selection as user operation information, and supplies the information to the selected-area calculation section 17. Specifically, the user-operation information acquisition section 16 acquires positions (coordinates) of the two points in the input image, which have been specified by the user using click-and-drag operation on a display, not illustrated in the figure, and supplies the positions to the selected-area calculation section 17.

Here, out of the two points specified by the click-and-drag operation, it is assumed that a position in the input image on which the user has clicked first is $p_1=(x_1, y_1)$, and a position in the input image on which the user is in process of drag operation and at a point in time of release (release a finger) is $p_3=(x_3, y_3)$ $(x_1<x_3)$.

The selected-area calculation section 17 calculates the convex quadrilaterals included in the user selected area on the basis of $p_1=(x_1, y_1)$ and $p_3=(x_3, y_3)$, which have been supplied from the user-operation information acquisition section 16 as user operation information. The convex quadrilateral included in the user selected area includes $p_1=(x_1, y_1)$, $p_2=(x_2, y_2)$ $p_3=(x_3, y_3)$, and $p_4=(x_4, y_4)$ in a clockwise direction. Accordingly, the point $p_1$ and the point $p_3$ are two points in the diagonal direction, and the point $p_2$ and the point $p_4$ are two points in the diagonal direction.

As specific processing, the selected-area calculation section 17 detects a recorded convex quadrilateral to which the point $p_1$ clicked by the user first in the input image belongs. The selected-area calculation section 17 calculates the two remaining points $p_2$ and $p_4$ in the selected area using the homography matrix H and the homography inverse matrix H-1 of the detected recorded convex quadrilateral. The information of the four points forming the selected area, that is to say, the positions of the point p1, the point $p_2$, the point $p_3$, and the point $p_4$ are supplied from the selected-area calculation section 17 to the selected-area display control section 18.

The selected-area display control section 18 displays the selected area determined on the basis of the click-and-drag operation by the user on the input image of the display. For example, as illustrated in FIG. 3, the determined selected area is displayed on the input image by changing the peripheral color or the inside color of the determined selected area with respect to the original input image. After that, the user is allowed to perform image edit processing, such as copy, paste, delete, and so on, on the selected area as necessary.

The image processing apparatus 1 is configured as described above.

Perspective-Area Selection Processing Flow

Next, a description will be given of perspective area selection processing, which is area-selection processing by the image processing apparatus 1, with reference to a flowchart in FIG. 4. This processing is started when a predetermined image is input into the image processing apparatus 1 as an input image, for example.

First, in step S1, the convex-quadrilateral extraction section 12 performs convex-quadrilateral extraction processing to detect shapes of convex quadrilaterals included in the input image, and to extract the shapes as convex quadrilaterals. Each configuration information on the plurality of convex quadrilaterals is supplied to the hierarchical structure building section 13 together with the input image. A detailed description will be given later of the convex-quadrilateral extraction processing later with reference to FIG. 5.

In step S2, the hierarchical structure building section 13 performs the hierarchical structure building processing for building a hierarchical structure of the convex quadrilaterals extracted from the input image by the convex-quadrilateral extraction section 12. The information indicating the hierarchical structure of the convex quadrilaterals (hierarchical structure information), which is the processing result of the hierarchical structure building processing, is supplied to the convex-quadrilateral storage section 15. The configuration information of the individual convex quadrilaterals included in the hierarchical structure is supplied to the homography matrix calculation section 14. A detailed description will be given later of the hierarchical structure building processing with reference to FIG. 9.

In step S3, the homography matrix calculation section 14 calculates the homography matrix H, by which projective transformation is performed on a convex quadrilateral into a unit square for each of the convex quadrilaterals included in the hierarchical structure, and the homography inverse matrix $H^{-1}$, which is the inverse matrix thereof.

In step S4, the convex-quadrilateral storage section 15 stores the information on the convex quadrilaterals detected from the input image. Specifically, the convex-quadrilateral storage section 15 stores the configuration information (the coordinates of the four points) of the plurality of individual convex quadrilaterals detected from the input image, the homography matrices H, the homography inverse matrices $H^{-1}$, and the hierarchical structure information of the convex quadrilaterals.

In step S5, the selected-area calculation section 17 performs area determination processing for determining a perspective projection selected area on the basis of the position $p_1$ and the position $p_3$ in the input image supplied from the user-operation information acquisition section 16. The determined selected area is displayed in the input image on the display, and the area determination processing is terminated. A detailed description will be given later of this processing with reference to FIG. 12.

When the area determination processing in step S5 is terminated, the perspective area selection processing is terminated.

Detailed Flow of Convex-Quadrilateral Extraction Processing

Next, a detailed description will be given of the convex-quadrilateral extraction processing, which is executed as step S1 in FIG. 4, with reference to the flowchart in FIG. 5.

First, in step S21, the convex-quadrilateral extraction section 12 performs area division processing, which divides the input image into a plurality of areas on the basis of color information of each pixel of the input image, a plurality of times. In the area division processing performed for a plurality of times, a scale parameter that determines granularity of area division is set differently for each processing. Accordingly, in step S21, the area division processing of the input image is performed for a plurality of times with different scale parameters.

For the area division processing for dividing the input image into a plurality of areas, it is possible to employ SRM (Statistical Region Merging: statistical area division), which has been proposed by an inventor of this disclosure, for example. Details of SRM is disclosed by Nock, R., Nielsen, F., 2004., Statistical region merging, IEEE Transactions on Pattern Analysis and Machine Intelligence 26 (11), 1452_1458. In this regard, the area division processing is not limited to SRM, and it is possible to employ any area division processing.

Figure 6B:
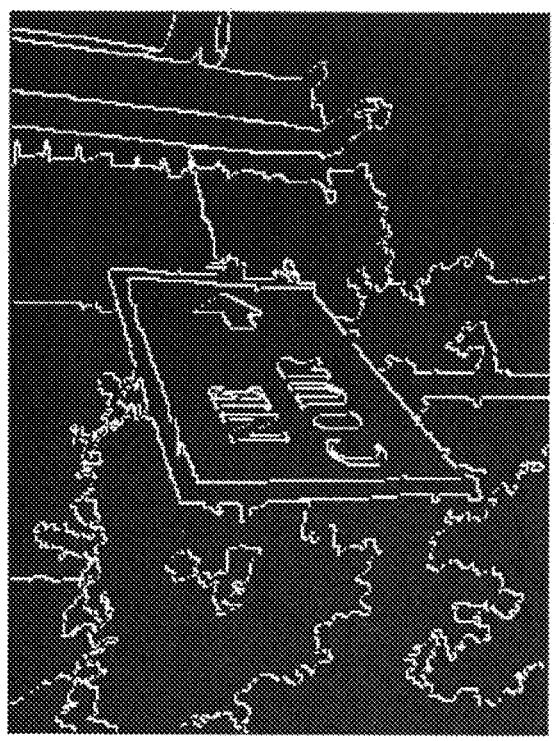
FIGS. 6A and 6B are explanatory diagrams of area division processing.
Figure 6A:
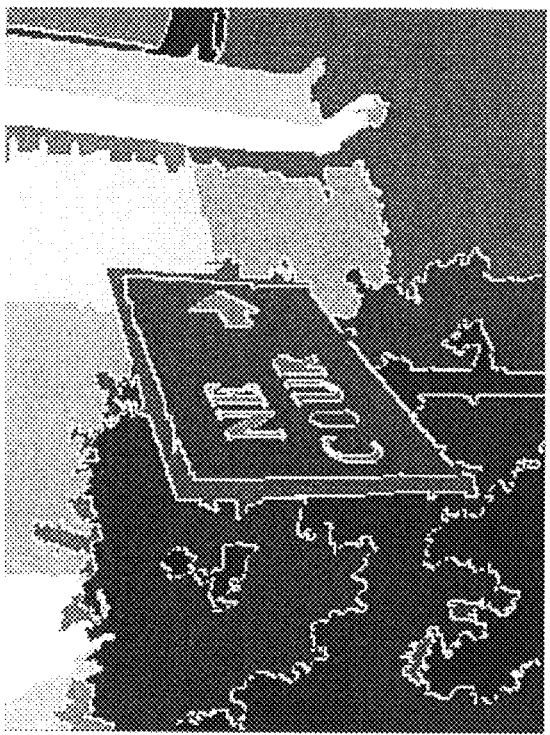

FIG. 6A illustrates a processing result of the area division processing executed using the image illustrated in FIG. 1A as an input image with a certain scale parameter. FIG. 6B is a diagram produced by binarizing the processing result in FIG. 6A for easily distinguishing boundaries of the individual areas.

It is possible to obtain an areas divided for each small object in the input image, or areas divided for each large object, which is a set of small objects, by performing the area division processing for a plurality of times with variously changed scale parameters.

Next, in step S22, the convex-quadrilateral extraction section 12 extracts external contours of the individual area division images, which are resultant images of the area division processing with variously changed scale parameters. Here, the external contours means the remaining contours produced by removing inner contours that exist inside the other contours in a closed manner out of the contours detected in the area division images.

In step S23, the convex-quadrilateral extraction section 12 selects a predetermined one contour out of the plurality of contours extracted in step S22.

In step S24, the convex-quadrilateral extraction section 12 detects two points having the longest distance with each other in a line segment of the selected contour, determines the two points as a point $p_1$ and a point $p_3$, and calculates the diameter $d=[p_1p_3]$ of the contour. Here, $[p_1p_3]$ represents calculation of a direct distance between the two points $p_1$ and $p_3$. In this regard, the convex-quadrilateral extraction section 12 determines a point having a smaller x-coordinate to be the point $p_1$ out of the two points $p_1$ and $p_3$ out of the two points detected in the line segment of the selected contour.

Figure 7:
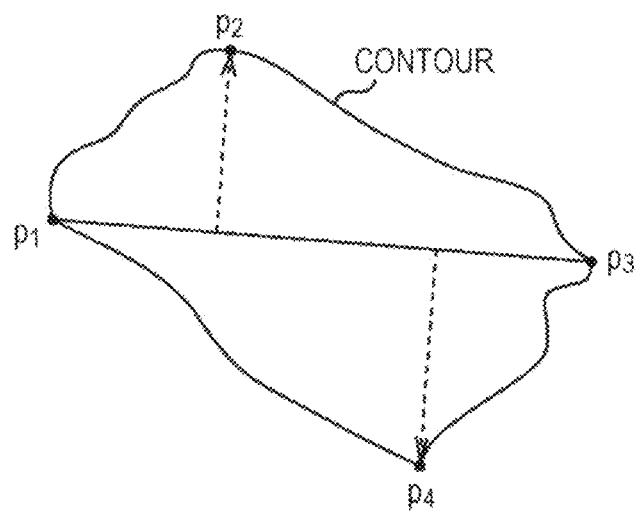
FIG. 7 is an explanatory diagram of the processing in step S25.

In step S25, as illustrated in FIG. 7, the convex-quadrilateral extraction section 12 determines a point $p_2$ that is farthest on the upper side, and a point $p_4$ that is farthest on the lower side from the line connecting the determined two points $p_1$ and $p_3$.

In step S26, the convex-quadrilateral extraction section 12 calculates a distance DIS between the selected contour and the quadrilateral ($p_1$, $p_2$, $p_3$, $p_4$) including the four points $p_1$, $p_2$, $p_3$, and $p_4$.

Figure 8:
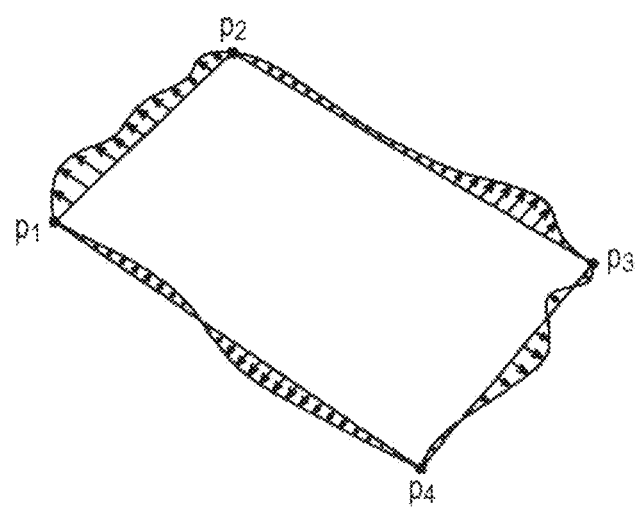
FIG. 8 is an explanatory diagram of the processing in step S26.

The distance DIS corresponds to an evaluation function that evaluates whether it is possible to approximate the selected contour by a quadrilateral. For the distance DIS, for example, as illustrated in FIG. 8, it is possible to employ an average value (average distance) of the individual distances produced by vertically extending a plurality of points that are sampled in the individual sides of the quadrilateral ($p_1$, $p_2$, $p_3$, $p_4$) to the contour at predetermined intervals. Also, for the distance DIS, it may be possible to employ a Hausdorff distance between a set of a plurality of points produced by sampling the individual sides of the quadrilateral ($p_1$, $p_2$, $p_3$, $p_4$) at predetermined intervals and a set of a plurality of points produced by sampling the selected contour at the predetermined intervals, and so on.

In step S27, the convex-quadrilateral extraction section 12 determines whether the calculation result of the distance DIS is less than or equal to a predetermined threshold value Th. It is possible to determine the threshold value Th to be, for example, a predetermined ratio (for example, 5%) of the diameter $d=[p_1p_3]$ of the quadrilateral ($p_1$, $p_2$, $p_3$, $p_4$), and so on.

In step S27, if determined that the calculation result of the distance DIS is the predetermined threshold value Th or less, the processing proceeds to step S28. And the convex-quadrilateral extraction section 12 employs the quadrilateral ($p_1$, $p_2$, $p_3$, $p_4$) corresponding to the selected contour as a candidate of convex quadrilaterals (recorded convex quadrilaterals) to be recorded in the convex-quadrilateral storage section 15.

On the other hand, in step S27, if determined that the calculation result of the distance DIS is greater than the predetermined threshold value Th, the processing in step S28 is skipped, and the processing proceeds to step S29. Accordingly, if the calculation result of the distance DIS is greater than the predetermined threshold value Th, the quadrilateral ($p_1$, $p_2$, $p_3$, $p_4$) corresponding to the selected contour does not become a candidate for the recorded convex quadrilaterals.

In step S29, the convex-quadrilateral extraction section 12 determines whether all the contours extracted in step S22 have been selected.

In step S29, if determined that all the contours extracted have not been selected yet, the processing returns to step S23, and the above-described processing is repeated. That is to say, the processing, in which a contour that is not yet selected from the plurality of contours extracted in step S22 is selected, and a quadrilateral produced by the selected contour is employed as a candidate of the recorded convex quadrilaterals in accordance with a predetermined determination condition, is repeated.

On the other hand, in step S29, if determined that the all the extracted contours have been selected, the convex-quadrilateral extraction processing is terminated, and the processing returns to FIG. 4.

As described above, in the convex-quadrilateral extraction processing, the input image is subjected to the area division processing, the contours of the objects are extracted, and the convex quadrilaterals included in the objects are extracted (recognized) on the basis of the extracted contour.

In this regard, in the above-described convex-quadrilateral extraction processing, among the contours extracted from the input image, a determination is made of whether only an outer contour can be a candidate for a recorded convex quadrilateral. However, a determination may be made of whether an inner contour can be a candidate in the same manner.

Detailed Flow of Hierarchical Structure Building Processing

Figure 9:
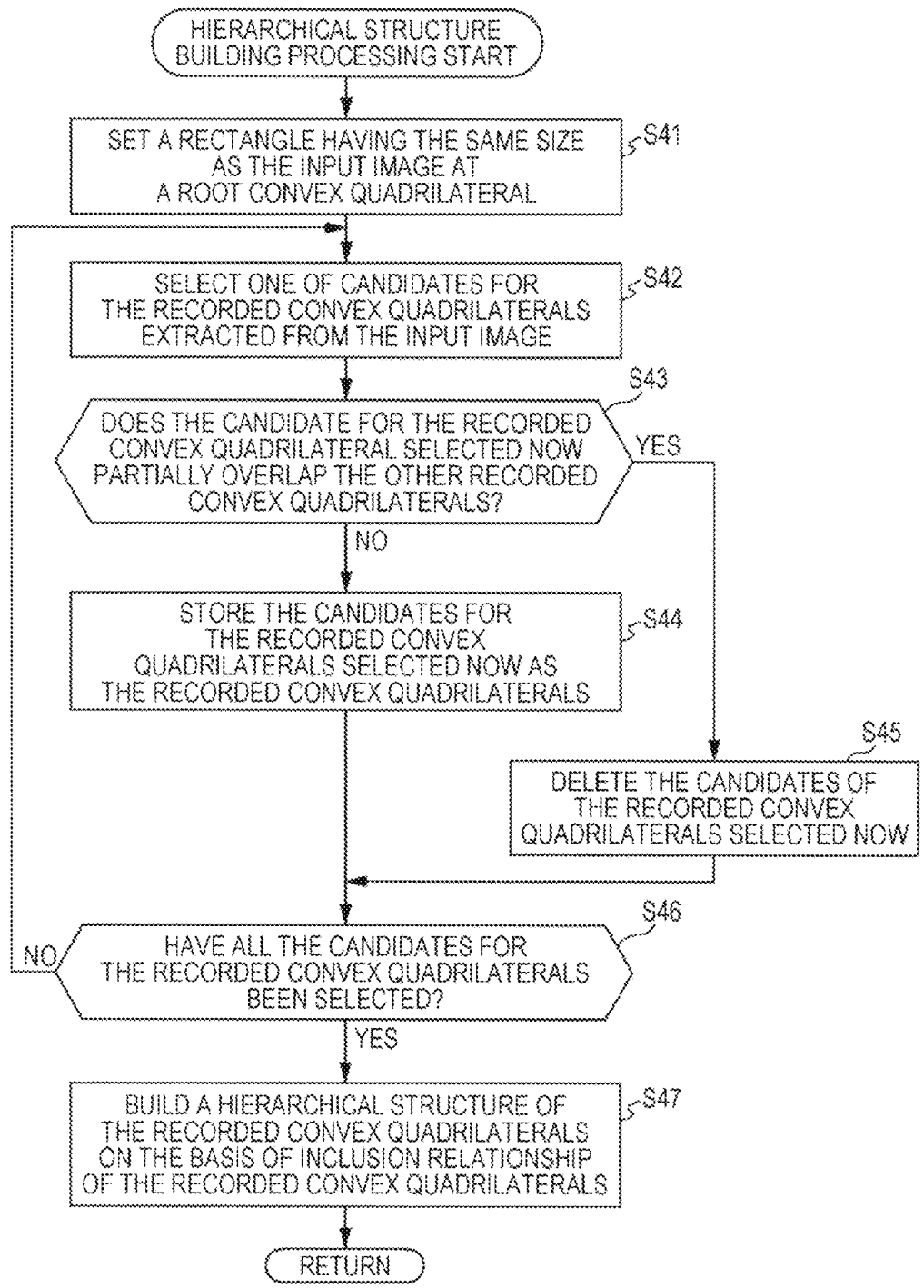
FIG. 9 is a flowchart illustrating details of hierarchical structure building processing executed as step S2 in FIG. 4.

Next, a detailed description will be given of the hierarchical structure building processing performed in step S2 in FIG. 4 with reference to the flowchart in FIG. 9.

In the hierarchical structure building processing, first, in step S41, the hierarchical structure building section 13 sets a rectangle having the same size as that of the input image at a root convex quadrilateral in the uppermost level of the hierarchical structure.

In step S42, the hierarchical structure building section 13 selects a predetermined one candidate among the candidates of the plurality of recorded convex quadrilaterals extracted by the convex-quadrilateral extraction processing in step S1 described above.

In step S43, the hierarchical structure building section 13 determines whether the candidate of the recorded convex quadrilaterals selected now partially overlap the other recorded convex quadrilaterals.

As described later, the processing from step S42 to S46 is performed for all the candidates of the recorded convex quadrilaterals extracted by the convex-quadrilateral extraction processing. A candidate of the recorded convex quadrilaterals executed before (selected in step S42) is stored in sequence as the recorded convex quadrilaterals on the basis of a certain condition. In step S43, a determination is made of whether a candidate of the recorded convex quadrilaterals, which is selected now, partially overlap the recorded convex quadrilateral stored before. In the first processing of step S43, there is no recorded convex quadrilaterals, and thus it is determined that the candidate of the recorded convex quadrilateral selected now does not partially overlap the other recorded convex quadrilaterals.

Here, the partially overlap means a positional relationship in which two convex quadrilaterals are in a state of partially overlapping with each other. If two convex quadrilaterals do not overlap with each other at all, and if the other of the convex quadrilaterals is wholly located inside one of the convex quadrilaterals, and thus the one of the convex quadrilaterals includes the other of the convex quadrilaterals, the two convex quadrilaterals are determined not to partially overlap with each other.

In step S43, if determined that the candidate for the recorded convex quadrilateral that is selected now does not partially overlap the other recorded convex quadrilaterals, the processing proceeds to step S44. And the hierarchical structure building section 13 stores the candidate for the recorded convex quadrilateral that is selected now into the convex-quadrilateral storage section 15 as a recorded convex quadrilateral.

On the other hand, in step S43, if determined that the candidate for the recorded convex quadrilateral that is selected now partially overlaps the other recorded convex quadrilaterals, the processing proceeds to step S45, and the hierarchical structure building section 13 deletes the candidate for the recorded convex quadrilateral that is selected now. Accordingly, if the candidate for the recorded convex quadrilateral that is selected now partially overlaps the other recorded convex quadrilaterals, the convex quadrilateral is not stored as a recorded convex quadrilateral.

Figure 10:
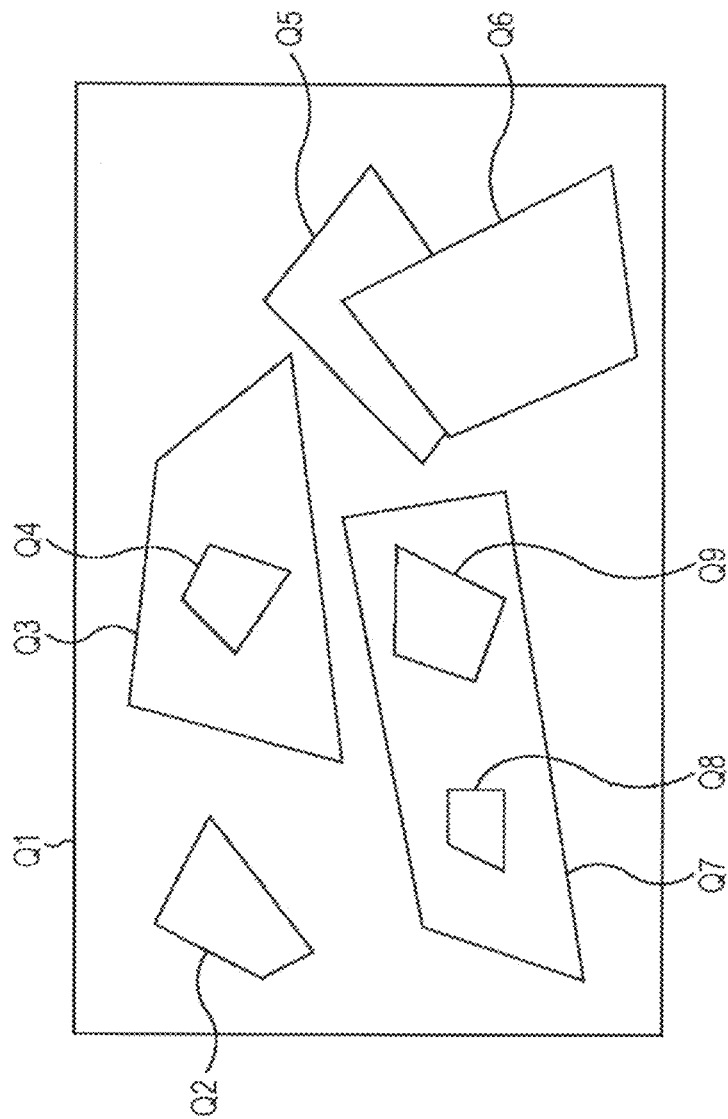
FIG. 10 is an explanatory diagram of processing in step S43.

For example, as illustrated in FIG. 10, it is assumed that a root convex quadrilateral Q1 is set, and the convex-quadrilateral extraction processing has extracted convex quadrilaterals Q2 to Q9 as candidates for the recorded convex quadrilaterals.

In the state illustrated in FIG. 10, the convex quadrilateral Q5 and the convex quadrilateral Q6 partially overlap. Accordingly, in step S42, if it is assumed that the convex quadrilaterals are selected in order of the convex quadrilaterals Q2, Q3, Q4, . . . , the convex quadrilateral Q6 overlaps the convex quadrilateral Q5 that is recorded in advance, and thus the convex quadrilateral Q6 is deleted.

In this regard, among the convex quadrilaterals Q2 to Q9 in FIG. 10, the convex quadrilateral Q4 is located only inside the convex quadrilateral Q3, and thus the convex quadrilateral Q4 is included in the convex quadrilateral Q3. Also, the convex quadrilaterals Q8 and Q9 are located only inside the convex quadrilateral Q7, and thus the convex quadrilaterals Q8 and Q9 are included in the convex quadrilateral Q7.

In step S46, the hierarchical structure building section 13 determines whether all the candidates for the recorded convex quadrilaterals extracted by the convex-quadrilateral extraction processing have been selected, that is to say, whether all the candidates for the recorded convex quadrilaterals have been subjected to verification of partial overlap.

In step S46, if determined that all the candidates of the recorded convex quadrilaterals have not been selected, the processing returns to step S42, and the processing in steps S42 to S46 described above is performed again. That is to say, a candidate for the recorded convex quadrilaterals that has not been selected is selected next, and a determination is made of whether the candidate partially overlap the convex quadrilaterals recorded in advance (recorded convex quadrilaterals).

On the other hand, in step S46, if determined that all the candidates of the recorded convex quadrilaterals have been selected, the processing proceeds to step S47. And the hierarchical structure building section 13 builds a hierarchical structure of the recorded convex quadrilaterals on the basis of the inclusion relationship of the recorded convex quadrilaterals. That is to say, if one of the convex quadrilaterals includes the other of the convex quadrilaterals, the hierarchical structure building section 13 locates the other of the convex quadrilaterals at a subordinate position of the one convex quadrilateral including the other of the convex quadrilaterals, and hierarchize all the recorded convex quadrilaterals in the hierarchical structure from the root convex quadrilateral.

Figure 11:
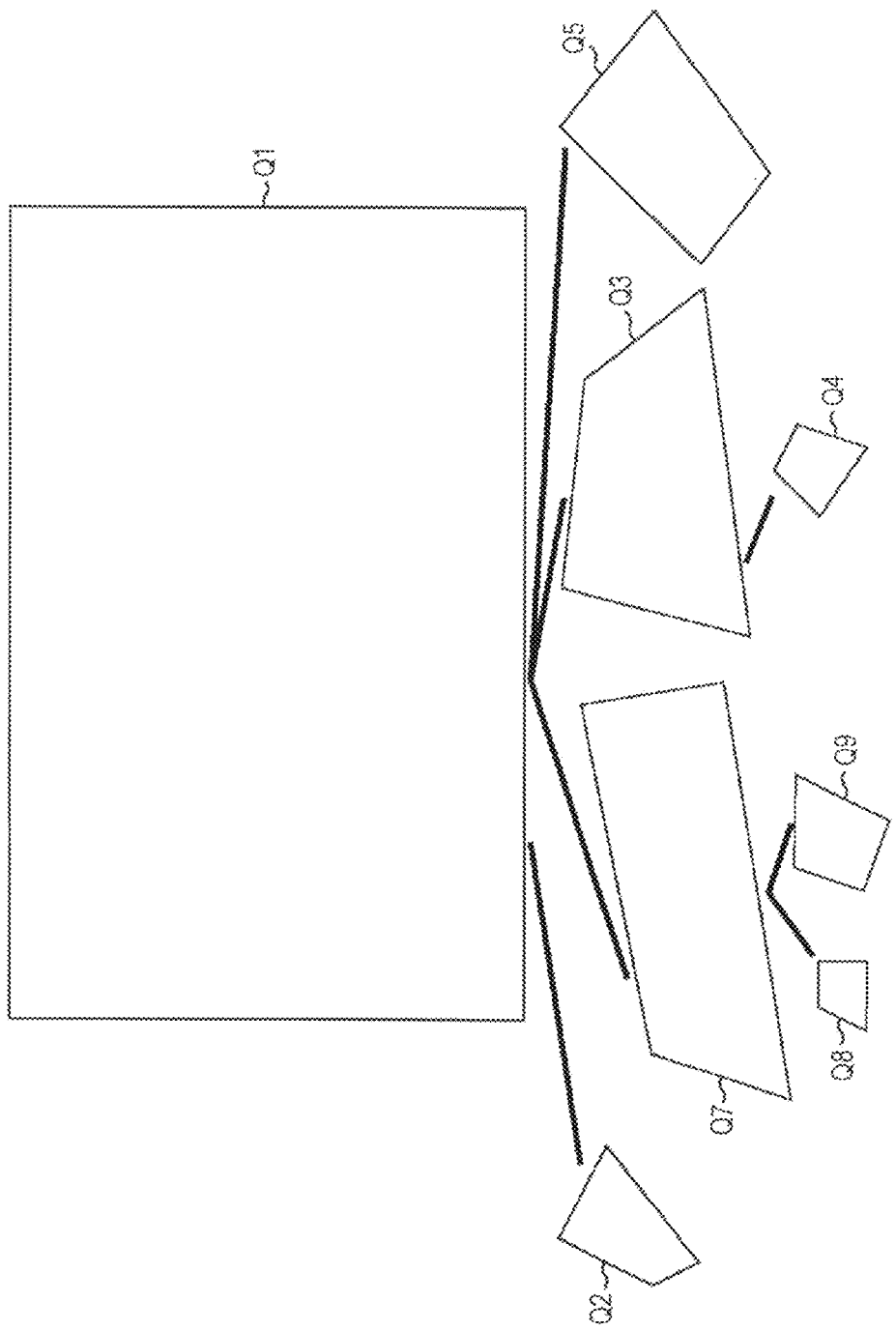
FIG. 11 is an explanatory diagram of processing in step S47.

FIG. 11 illustrates a result when a hierarchical structure is built for the convex quadrilaterals Q2 to Q9 illustrated in FIG. 10 (note that the partially overlapped convex quadrilateral Q6 is excluded). In this case, the root convex quadrilateral Q1 is structured into the uppermost first hierarchy, the convex quadrilaterals Q2, Q3, Q5, and Q7 are structured into the second hierarchy, and the convex quadrilaterals Q4, Q8, and Q9 are structured into the third hierarchy.

In step S47, the hierarchical structure building section 13 causes the convex-quadrilateral storage section 15 to store the result of building the hierarchical structure of the recorded convex quadrilaterals on the basis of the inclusion relationships of the recorded convex quadrilaterals as hierarchical structure information, and the hierarchical structure building processing is terminated. After the hierarchical structure building processing is terminated, the processing returns to FIG. 4.

Detailed Flow of Area Determination Processing

Figure 12:
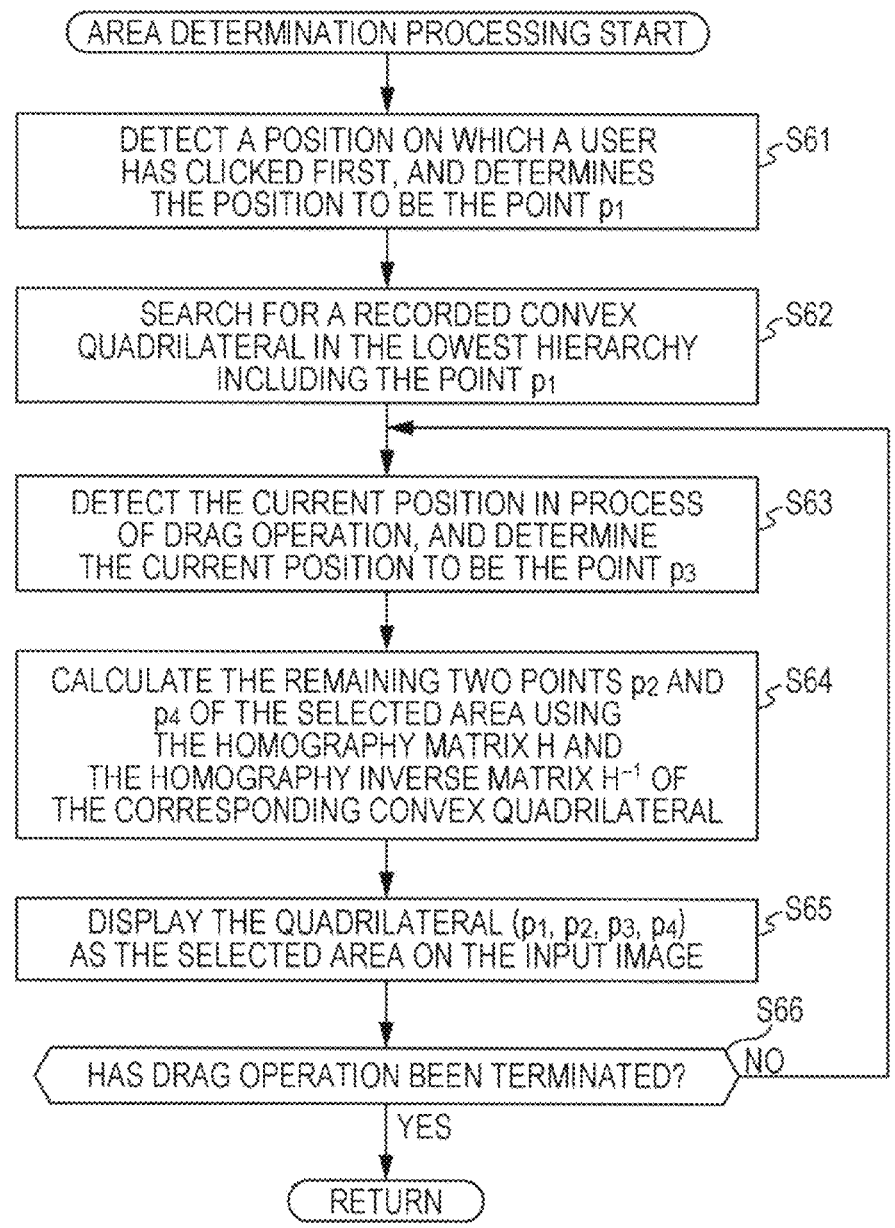
FIG. 12 is a flowchart illustrating details of area determination processing executed as step S5 in FIG. 4.

Next, a detailed description will be given of the area determination processing performed as step S5 in FIG. 4 with reference to the flowchart in FIG. 12.

In the area determination processing, first, in step S61, the selected-area calculation section 17 obtains the position $(x_1, y_1)$ supplied from the user-operation information acquisition section 16 so as to detect the position $(x_1, y_1)$ in the input image, which has been clicked by the user first, and determines the point to be the point $p_1=(x_1, y_1)$.

In step S62, the selected-area calculation section 17 detects the recorded convex quadrilaterals in the lowest hierarchy among the recorded convex quadrilaterals including the point $p_1$.

It is possible to detect the recorded convex quadrilaterals including the point $p_1$, for example, by the following method.

In order to examine whether a certain point b is located inside the convex quadrilateral $(b_1, b_2, b_3, b_4)$ including a point $b_1$, a point $b_2$, a point $b_3$, and a point $b_4$, the following four kinds of sets ought to be checked whether three points in the sets are all arranged clockwise or not: $(b_1, b_2, b)$, $(b_2, b_3, b)$, $(b_3, b_4, b)$, and $(b_4, b_1, b)$.

And, for example, whether the three points $(b_1, b_2, b)$ are arranged clockwise or not can be checked by calculating the following 2×2 determinant det. If the determinant det is greater than 0 (det>0), the arrangement of the three points $(b_1, b_2, b)$ represents clockwise.

$$\det = \left\| \begin{matrix} x_1 - x & x_2 - x \\ y_1 - y & y_2 - y \end{matrix} \right\|$$

$$b_1 = (x_1, y_1),$$

$$b_2 = (x_2, y_2),$$

$$b = (x, y).$$

For the remaining three kinds of three points, the same calculation is carried out, and it is possible to check whether those points are arranged clockwise.

It is possible for the selected-area calculation section 17 to check whether the recorded convex quadrilateral includes the point $p_1$ in order from the recorded convex quadrilaterals of the subordinate side in the hierarchical structure by the above-described method, and to detect recorded convex quadrilateral in the lowest hierarchy among the recorded convex quadrilaterals including the point $p_1$. In this regard, a method of detecting a recorded convex quadrilateral including the point $p_1$ is not limited to the above-described method, and another method may be used.

The recorded convex quadrilateral in the lowest hierarchy, which includes the point $p_1$, obtained as a result is a recorded convex quadrilateral corresponding to the position that the user has clicked, and thus hereinafter is referred to as a corresponding convex quadrilateral.

In this regard, if there is no corresponding convex quadrilateral that corresponds to the point $p_1$ on which the user has clicked first, the root convex quadrilateral is employed as the corresponding convex quadrilateral. In this case, the selected area becomes a rectangle in the same manner as a general method of specifying an area.

Alternatively, if there is no corresponding convex quadrilateral that corresponds to the point $p_1$ on which the user has clicked first, the area division processing is performed again only on the predetermined area surrounding the point $p_1$ in the input image with a plurality of kinds of scale parameters set, and object shapes that are convex quadrilaterals in the input image may be searched again.

In step S63, the selected-area calculation section 17 obtains a position $(x_3, y_3)$ in the process of drag operation, which is supplied from the user-operation information acquisition section 16, so as to detect the position $(x_3, y_3)$ in the input image in the process of drag operation, and determines that position to be the point $p_3=(x_3, y_3)$.

In step S64, the selected-area calculation section 17 calculates the remaining two points $p_2$ and $p_4$ of the selected area using the homography matrix H and the inverse matrix $H^{-1}$ thereof of the corresponding convex quadrilateral from the convex-quadrilateral storage section 15.

A detailed description will be given of the processing in step S64 with reference to FIG. 13. That is to say, a description will be given of a method of calculating the remaining two points $p_2$ and $p_4$ of the perspective selected area when the two points $p_1$ and $p_3$ in the input image are obtained using click-and-drag operation by the user.

Here, as described above, out of the two points $p_1=(x_1, y_1)$ and $p_3=(x_3, y_3)$ in the input image, which are determined by click-and-drag operation of the user, the point p1 is located on the left side than the point $p_3$ in the image. That is to say, the magnitude relationship between $x_1$ and $x_3$ is $x_1 < x_3$.

First, the selected-area calculation section 17 obtains the points $p_1'$ and $p_3'$ that have been produced by performing projective transformation on the two points $p_1$ and $p_3$ in the object plane onto an isothetic plane, which is coplanar with the input image in accordance with the homography matrix H of the corresponding convex quadrilateral.

That is to say, using the points $p_1\tilde{}$ and $p_3\tilde{}$ produced by three-dimensionalizing the two points $p_1$ and $p_3$ as follows, $$\tilde{p_1} = \begin{pmatrix} x_1 \\ y_1 \\ w_1 \end{pmatrix} = \begin{pmatrix} x_1 \\ y_1 \\ 1 \end{pmatrix}, \tilde{p_3} = \begin{pmatrix} x_3 \\ y_3 \\ w_3 \end{pmatrix} = \begin{pmatrix} x_3 \\ y_3 \\ 1 \end{pmatrix}$$

Points $p_1\tilde{}'$ and $p_3\tilde{}'$ in the isothetic plane are obtained by the following expression.

$$p_1\tilde{}' = Hp_1\tilde{}, p_3\tilde{}' = Hp_3\tilde{}$$

It is possible to return (dehomogeneize) a point $p\tilde{}'$ in the three-dimensional coordinate system to the point p' in the two-dimensional coordinate system by the following expression:

$$\tilde{p}' = (x', y', w') \xrightarrow{\text{dehomogeneize}} p' = \left( \frac{x'}{w'}, \frac{y'}{w'} \right)$$

And thus it is possible to obtain the points $p_1'$ and $p_3'$ in the isothetic plane in the same manner as follows.

$$\tilde{p_1}' \xrightarrow{\text{dehomogeneize}} p_1' = (x_1', y_1'), \tilde{p_3}' \xrightarrow{\text{dehomogeneize}} p_3' = (x_3', y_3')$$

Next, the selected-area calculation section 17 calculates the remaining two points $p_2'$ and $p_4'$ of the rectangle $(p_1', p_2', p_3', p_4')$ that is produced by performing projective transformation on the selected area $(p_1, p_2, p_3, p_4)$ in the object plane, and that has the points $p_1'$ and $p_3'$ in a diagonal direction.

Here, assuming that $$x_{min}' = \min\{x_1', x_3'\}, x_{max}' = \max\{x_1', x_3'\}, \text{ and}$$

$$y_{min}' = \min\{y_1', y_3'\}, y_{max}' = \max\{y_1', y_3'\}, \text{ then}$$

if $y_3' < y_1'$, the point $p_2'$ and the point $p_4'$ of the rectangle $(p_1', p_2', p_3', p_4')$ become as follows.

$$p_2' = (x_{max}', y_{max}') \text{ and } p_4' = (x_{min}', y_{min}')$$

And when the point $p_2'$ and the point $p_4'$ are transformed into the three-dimensional coordinate system, $$\tilde{p_2}' = (x_{max}', y_{max}', 1) \text{ and } \tilde{p_4}' = (x_{min}', y_{min}', 1).$$

Figure 13:
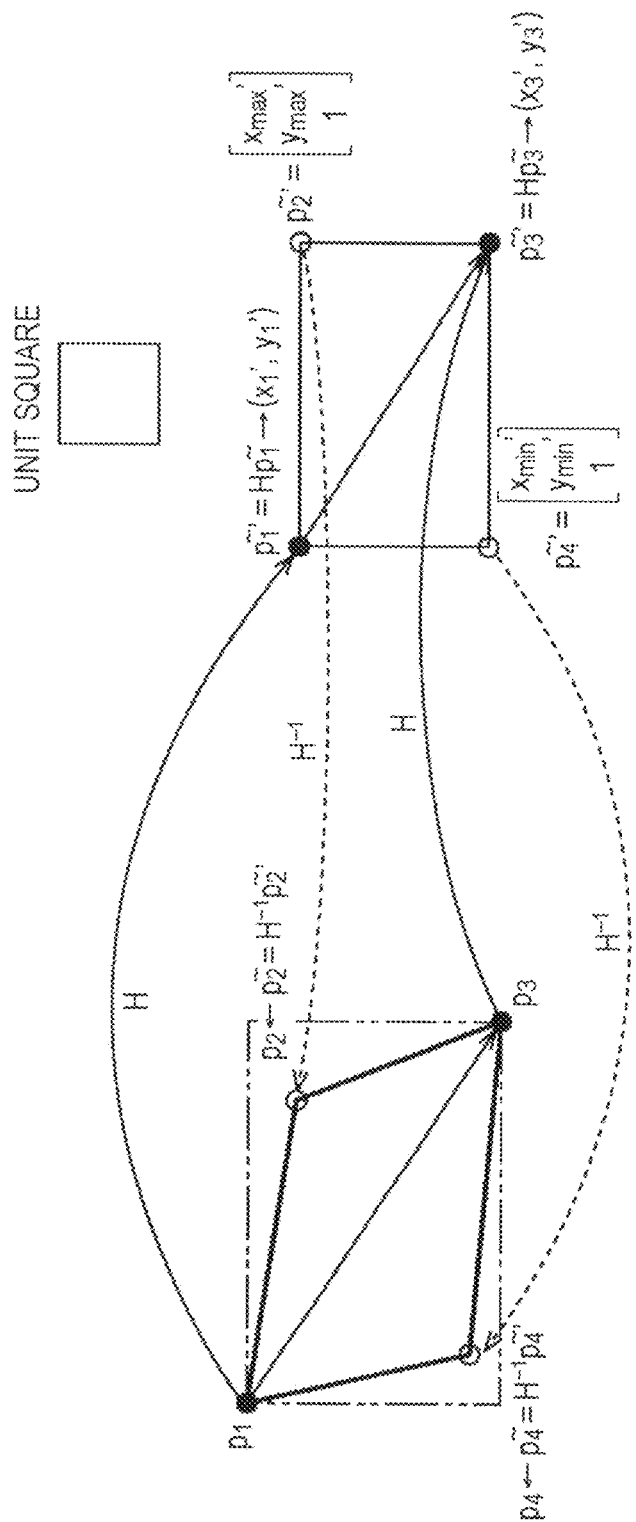
FIG. 13 is a diagram illustrates details of the processing in step S64.

FIG. 13 illustrates a rectangle ($p_1'$, $p_2'$, $p_3'$, $p_4'$) in the case where $y_3' < y_1'$.

On the other hand, if $y_2' > y_1'$, the point $p_2'$, the point $p_4'$, the point $p_2\sim'$, and the point $p_4\sim'$ become as follows.

$$p_2' = (x_{min}', y_{max}'), p_4' = (x_{max}', y_{min}')$$

$$p_2\sim' = (x_{min}', y_{max}', 1), \text{ and } p_4\sim' = (x_{max}', y_{min}', 1).$$

Lastly, the selected-area calculation section 17 performs inverse transformation on the points $p_2\sim'$ and $p_4\sim'$ that are three-dimensionalized from the point $p_2'$ and the point $p_4'$ out of the rectangle ($p_1'$, $p_2'$, $p_3'$, $p_4'$) obtained as described above by the homography inverse matrix $H^{-1}$ of the corresponding convex quadrilateral. Thereby, it is possible to obtain the remaining two points $p_2$ and $p_4$ of the selected area ($p_1$, $p_2$, $p_3$, $p_4$) in the object plane. That is to say, the remaining two points $p_2$ and $p_4$ of the selected area in the object plane can be obtained as follows.

$$\tilde{p_2} = H^{-1}\tilde{p_2}', \quad \tilde{p_2} \xrightarrow{\text{dehomogeneize}} p_2$$

$$\tilde{p_4} = H^{-1}\tilde{p_4}', \quad \tilde{p_4} \xrightarrow{\text{dehomogeneize}} p_4$$

In step S64, it is possible to calculate the remaining two points $p_2$ and $p_4$ of the selected area in the object plane using the homography matrix H of the corresponding convex quadrilateral and the inverse matrix $H^{-1}$ thereof as described above. As the processing in step S64, the selected-area calculation section 17 supplies the information of the four points forming the selected area, that is to say, the positions of the point $p_1$, the point $p_2$, the point $p_3$, and the point $p_4$ to the selected-area display control section 18.

And in step S65, the selected-area display control section 18 displays the quadrilateral ($p_1$, $p_2$, $p_3$, $p_4$) formed by the four points, that is to say, the point $p_1$, the point $p_2$, the point $p_3$, and the point $p_4$ onto the input image of the display as the selected area.

In step S66, the selected-area calculation section 17 determines whether the user's drag operation has been completed or not. To put it in another way, the selected-area calculation section 17 determines whether the user has released a finger in the process of drag operation to determine the position of the point $p_3$.

In step S66, if determined that the user's drag operation has not been completed yet, the processing returns to step S63, and the above-described processing is repeated.

On the other hand, in step S66, if determined that the user's drag operation has been completed, the area determination processing is terminated, and the processing returns to FIG. 4.

In above-described step S62, when the corresponding convex quadrilateral corresponding to the point $p_1$ clicked by the user first is detected, the selected-area display control section 18 may display a whole area or a peripheral shape of the corresponding convex quadrilateral on the input image for a moment (a predetermined period of time), and so on in order to present the corresponding convex quadrilateral to the user. Thereby, it is possible for the user to easily suppose what kind of convex quadrilateral area is formed as the selected area by the click-and-drag operation.

Also, by the above-described processing, the recorded convex quadrilateral corresponding to the point $p_1$ on which the user has clicked first is employed as the corresponding convex quadrilateral. However, it is thought that the position of the point $p_3$ obtained after the drag operation jumps out from the recorded convex quadrilateral corresponding to the point $p_1$. In such a case, the recorded convex quadrilateral corresponding to the point $p_3$ may be changed to the corresponding convex quadrilateral.

As described above, the perspective area selection processing performed by the image processing apparatus 1 searches for objects having a shape of a convex quadrilateral in the input image, and extracts convex quadrilaterals in the input image on the basis of the detected objects having a shape of a convex quadrilateral. Also, a hierarchical structure among the extracted convex quadrilaterals is built on the basis of the inclusion relationships between the extracted convex quadrilaterals. And the selected area is determined in perspective in accordance with the shape of the convex quadrilateral corresponding to the position on which the user has clicked, and is displayed.

Accordingly, it is possible for the user to select an oblique area in perspective projection in accordance with an object shape in the input image, which has been difficult to specify using a related-art rectangle described with reference to FIG. 3. Thereby, it is possible to provide a new method that allows the user to select a desired area in an input image.

Figure 14:
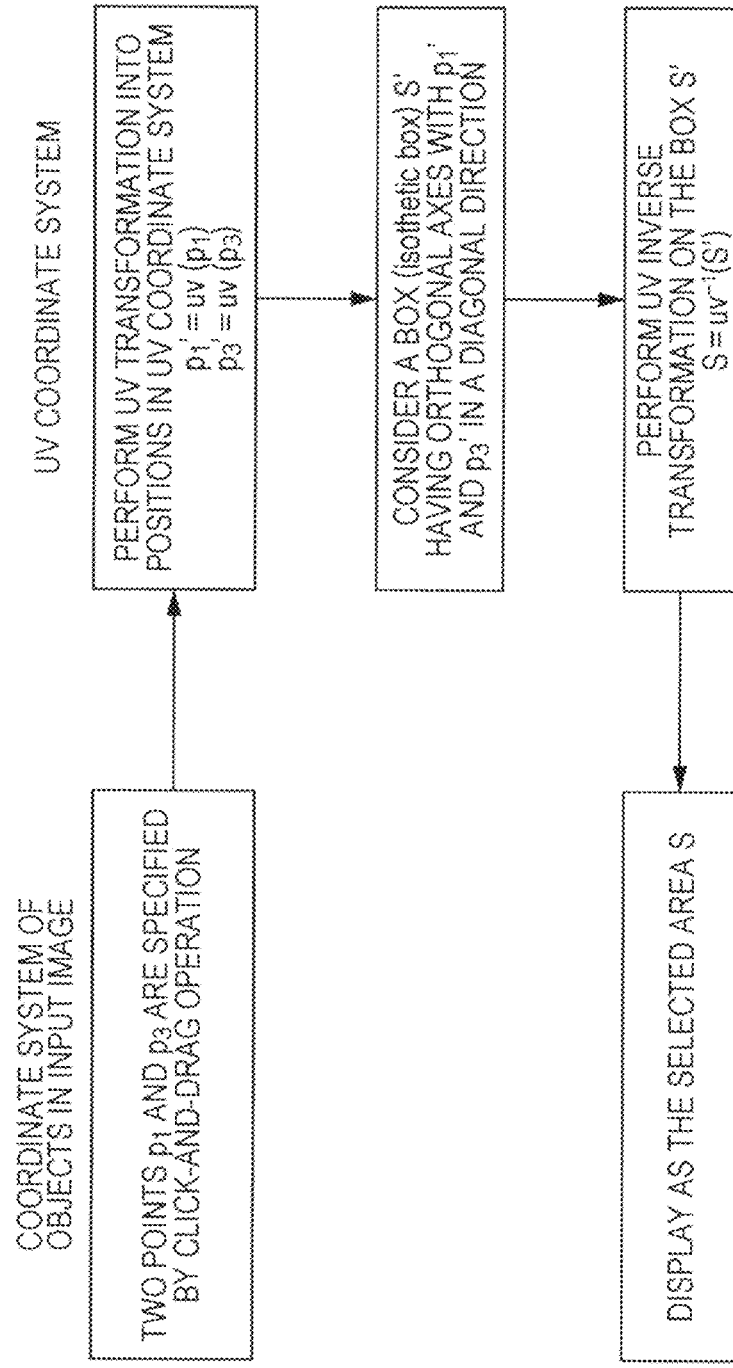
FIG. 14 is a diagram illustrating a concept of the present technique.

FIG. 14 is a diagram illustrating a concept of the present technique.

Two points $p_1$ and $p_3$ in the input image are specified by click-and-drag operation. The image processing apparatus 1 searches for an object having a convex quadrilateral shape in the input image, and extracts the convex quadrilateral corresponding to the object to recognize an object plane in the image. The object plane is a plane included in the object in perspective projection (perspective projection plane). Also, the image processing apparatus 1 performs UV-coordinate transformation on the two points $p_1$ and $p_3$ specified by the user to obtain the points $p_1'$ and $p_3'$ in the isothetic plane, which is a plane formed by a U-axis and a V-axis. And the image processing apparatus 1 considers an isothetic box S' having the two points $p_1'$ and $p_3'$ in a diagonal direction. The image processing apparatus 1 performs inverse transformation on the isothetic box S' onto the object plane in the input image so as to generate a perspective selected area S, and displays the perspective selected area S.

Accordingly, in the above-described example, a plane (convex quadrilateral) corresponding to an object shape is recognized from the input image. However, by the present technique, it is also possible to recognize a curved surface of a sphere, and so on, corresponding to the object shape as an object planes from the input image, and to generate a selected area S to be an object plane having the two points identified by the click-and-drag operation in a diagonal direction.

That is to say, in the present technique, an object plane may be any surface regardless of whether a curved surface or a plane as long as it is possible to define a transformation matrix UV which transforms a coordinate system in an object plane of the input image into a coordinate system in an isothetic plane, and a transformation inverse matrix $UV^{-1}$ which transforms a coordinate system in the isothetic plane into a coordinate system of the object plane in the input image.

Example of Application to which the Present Technique is Applied

Figure 15:
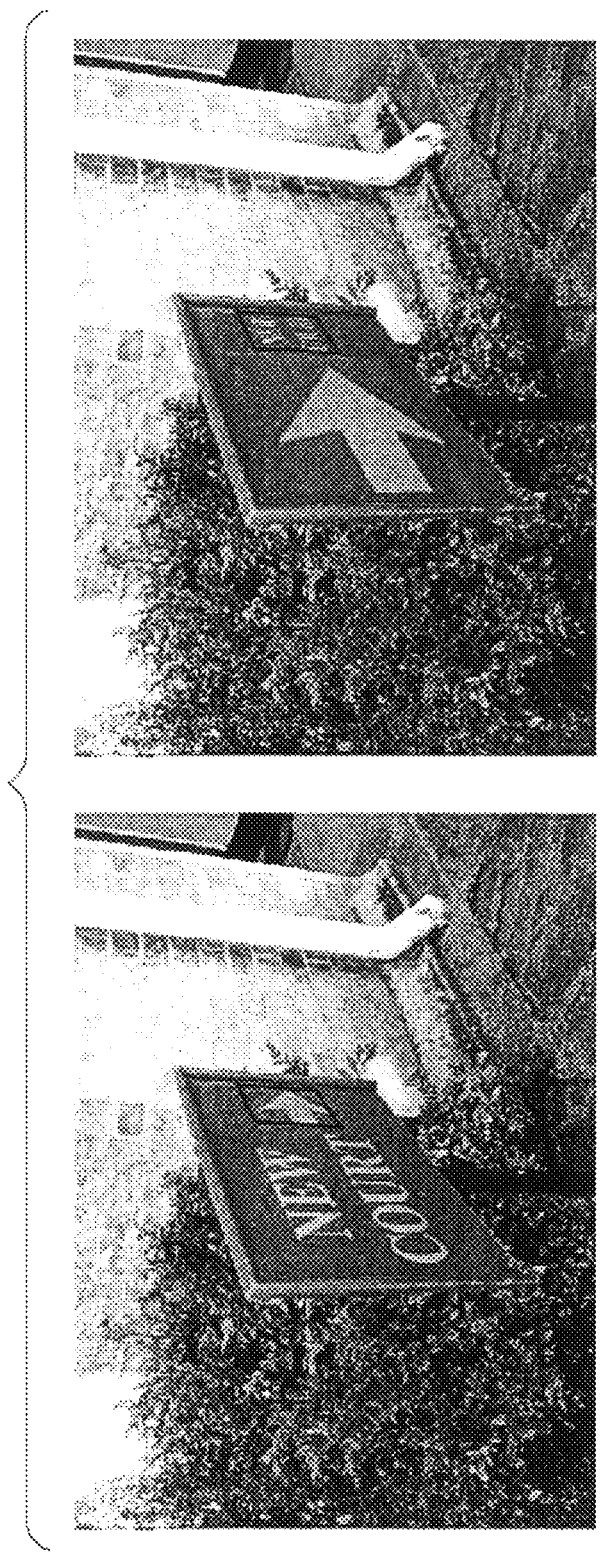
FIG. 15 is a diagram illustrating an example of an application to which the perspective area selection processing is applied.
Figure 16:
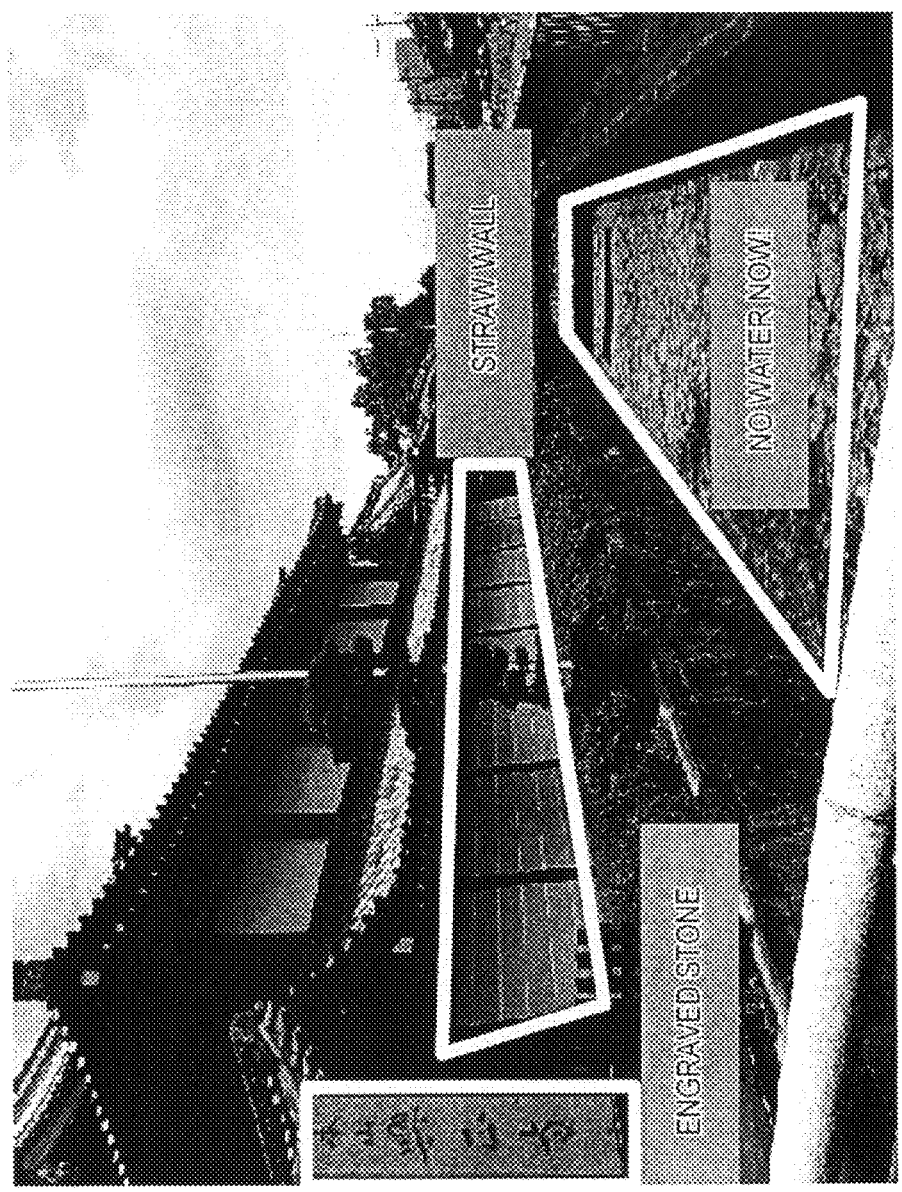
FIG. 16 is a diagram illustrating an example of an application to which the perspective area selection processing is applied.

FIG. 15 and FIG. 16 illustrate examples of applications to which the perspective area selection processing according to the present technique is applied.

FIG. 15 is an example in which the present technique is applied to an application for performing swap processing, in which a first area and a second area are selected by the above-described perspective area selection processing in the input image, and the image of the first area and the image of the second area are swapped. A character area of "NEW COURT" is selected for the first area, an arrow mark on the right side thereof is selected for the second area, and the two area images are swapped in the image after the processing on the right side.

In the case of performing such swap processing, it is possible to further provide the image processing apparatus 1 with an image edit section that obtains the positions of the point $p_1$, the point $p_2$, the point $p_3$, and the point $p_4$, of the first area and the second area from the selected-area calculation section 17, and performs swap processing between the first area image and the second area image.

FIG. 16 is an example of applying the present technique to an annotation system in which a desired area in the input image is clearly illustrated by the perspective area selection processing, and annotations are added.

It is possible to apply the present technique to area selection processing in various images, such as display images of a smart phone, a navigation apparatus, and so on, in addition to images captured by a digital camera, and so on.

In this regard, in the example described above, the two points $p_1$ and $p_3$ are specified in a diagonal direction using click-and-drag operation. However, positions in an image may be specified by another method, for example, by tapping two points, and so on.

Also, in the example described above, a convex quadrilateral having two points $p_1$ and $p_3$ specified by the user in a diagonal direction using click-and-drag operation is formed, and displayed as a user selected area. However, a shape to be the user-selected area may be a polygon other than a convex quadrilateral, such as a circle, an ellipse, and so on. Also, corners of the shape of a selected area may be rounded, and changes may be suitably added, for example, a shade may be added, and so on.

Further, as a user setting screen, a slider for adjusting the number of hierarchies in the hierarchical structure, and so on may be provided. And in the above-described hierarchical structure building processing, the user may be allowed to set the number of hierarchical levels (granularity) in the hierarchical structure of the recorded convex quadrilaterals.

Also, in the above-described example, a recorded convex quadrilateral in the lowest level is determined to be a corresponding convex quadrilateral among the recorded convex quadrilaterals including the point $p_1$. However, a recorded convex quadrilateral including the point $p_1$ in a predetermined hierarchy in a hierarchical structure, such as a hierarchy specified by the user in a user setting screen, and so on, may be determined to be the corresponding convex quadrilateral.

Example of Configuration in the Case of Achieving by Computer

The above-described series of processing can be executed by hardware or can be executed by software. When the series of processing is executed by software, programs of the software may be installed in a computer. Here, the computer includes a computer that is built in a dedicated hardware, and for example, a general-purpose personal computer, etc., capable of executing various functions by installing various programs.

FIG. 17 is a block diagram illustrating an example of a hardware configuration of the computer that executes the above-described series of processing by programs.

In the computer, a CPU (Central Processing Unit) 101, a ROM (Read Only Memory) 102, a RAM (Random Access Memory) 103 are mutually connected through a bus 104.

An input/output interface 105 is further connected to the bus 104. An input section 106, an output section 107, a storage section 108, a communication section 109, and a drive 110 are connected to the input/output interface 105.

The input section 106 includes a keyboard, a mouse, a microphone, and so on. The output section 107 includes a display, a speaker, and so on. The storage section 108 includes a hard disk, a nonvolatile memory, and so on. The communication section 109 includes a network interface, and so on. The drive 110 drives a removable recording medium 111, such as a magnetic disk, an optical disc, a magneto-optical disc, or a semiconductor memory, and so on.

In the computer having the configuration as described above, the CPU 101 loads the program stored, for example in storage section 108 to the RAM 103 through the input/output interface 105 and the bus 104 to execute the program, thereby the above-described series of processing is performed.

In the computer, the program can be installed in the storage section 108 through the input/output interface 105 by attaching the removable recording medium 111. Also, the program can be received by the communication section 109 through a wired or a wireless transmission medium, such as a local area network, the Internet, a digital satellite broadcasting, etc., and can be installed in the storage section 108. In addition, the program can be installed in the ROM 102 or the storage section 108 in advance.

In this regard, in the present specification, the steps described in the flowchart are executed in time series in accordance with the described sequence as a matter of course. Alternatively, the steps may not be executed in time series, but may be executed in parallel or at necessary timing, such as at the time of being called, or the like.

An embodiment of the present disclosure is not limited to the above-described embodiments. It is possible to make various changes without departing from the gist of the present technique.

For example, it is possible to configure the present technique in cloud computing, in which one function is shared and coordinated by a plurality of apparatuses through a network.

Also, each step in the flowchart described above can be shared and executed by a plurality of apparatuses in addition to be executed by one apparatus.

Further, in the case where one step includes a plurality of processing, the plurality of processing included in the one step can be shared and executed by a plurality of apparatuses in addition to be executed by one apparatus.

The image processing apparatus 1 may be configured as a single apparatus that provides a user interface for specifying an oblique area in perspective projection as a user-selected area. Alternatively, the image processing apparatus 1 may be provided as one part (one function) of an image processing apparatus that performs the other image edit processing, and so on.

In this regard, it is possible to configure the present technique as follows.

(1) An image processing apparatus including: an acquisition section configured to acquire positional information specified by a user on an input image for specifying area selection; and out of a calculation result of a transformation matrix between an object plane being a perspective projection plane formed by an object in the input image and an isothetic plane, a selected-area calculation section configured to calculate an area in the object plane as a selected area by the user using the transformation matrix of the object plane corresponding to the positional information specified by the user.

(2) The image processing apparatus according to (1), further including: a recognition section configured to recognize the object plane in the input image; and a transformation matrix calculation section configured to calculate a transformation matrix between the object plane recognized by the recognition section and the isothetic plane.

(3) The image processing apparatus according to (2), wherein the recognition section recognizes a convex quadrilateral formed by an object in the input image as the object plane, and the transformation matrix calculation section calculates a transformation matrix between the convex quadrilateral recognized by the recognition section and a unit square as the isothetic plane.

(4) The image processing apparatus according to (3), wherein the recognition section performs area division processing on the input image to extract a contour of the object, and recognizes the convex quadrilateral formed by the object on the basis of the extracted contour.

(5) The image processing apparatus according to any one of (1) to (4), further including a hierarchical structure building section configured to build a hierarchical structure of a plurality of the object planes, wherein the selected-area calculation section calculates an area in the object plane as the selected area by the user using the transformation matrix of the object plane having a predetermined hierarchy corresponding to the positional information specified by the user.

(6) The image processing apparatus according to (5), wherein the selected-area calculation section uses the transformation matrix of the object plane having a lowest level corresponding to the positional information specified by the user.

(7) The image processing apparatus according to any one of (1) to (6), further including a display control section configured to display the object plane corresponding to the positional information specified by the user.

(8) The image processing apparatus according to (7), wherein the display control section displays the object plane corresponding to the positional information specified by the user in accordance with area-selection specification operation by the user, and deletes the object plane after passage of a predetermined time period.

(9) The image processing apparatus according to any one of (1) to (8), wherein the acquisition section acquires at least two points specified by the user on the input image as the positional information.

(10) The image processing apparatus according to (9), wherein the acquisition section acquires the two points in a diagonal direction, specified by the user, on the input image as the positional information, and the selected-area calculation section calculates two points other than the two points in the diagonal direction, specified by the user, using the transformation matrix out of four points forming the convex quadrilateral as the object plane.

(11) The image processing apparatus according to any one of (1) to (10), wherein the transformation matrix is a homography matrix and a homography inverse matrix being an inverse matrix thereof.

(12) The image processing apparatus according to any one of (1) to (11), further including an image edit section configured to perform swap processing for swapping a first area image being the selected area by the user, calculated on the basis of a first piece of the positional information, and a second area image being the selected area by the user, calculated on the basis of a second piece of the positional information.

(13) A method of processing an image, the method including: acquiring positional information specified by a user on an input image for specifying area selection; and out of a calculation result of a transformation matrix between an object plane being a perspective projection plane formed by an object in the input image and an isothetic plane, calculating an area in the object plane as a selected area by the user using the transformation matrix of the object plane corresponding to the positional information specified by the user.

(14) A program for causing a computer to perform processing including: acquiring positional information specified by a user on an input image for specifying area selection; and out of a calculation result of a transformation matrix between an object plane being a perspective projection plane formed by an object in the input image and an isothetic plane, calculating an area in the object plane as a selected area by the user using the transformation matrix of the object plane corresponding to the positional information specified by the user.

The present disclosure contains subject matter related to that disclosed in Japanese Priority Patent Application JP 2012-176619 filed in the Japan Patent Office on Aug. 9, 2012, the entire contents of which are hereby incorporated by reference.

What is claimed is:

1. An image processing apparatus, comprising:
one or more processors configured to:
acquire positional information specified by a user on an input image to specify an area selection, wherein the positional information comprises first two points in a diagonal direction that form a convex quadrilateral recognized in the input image based on a shape of an object in the input image; and
calculate an area of the convex quadrilateral in an object plane in the input image as a user selected area that corresponds to the positional information specified by the user, wherein the calculation of the area comprises:
perform coordinate transformation of the first two points based on a transformation matrix to determine second two points in an isothetic plane corresponding to the first two points in the object plane;
calculate third two points in the isothetic plane such that the second two points and the third two points form a isothetic box corresponding to the convex quadrilateral; and
inverse transform the third two points based on an inverse transformation matrix to determine fourth two points in the object plane corresponding to the third two points, wherein the first two points and the fourth two points form the convex quadrilateral,
wherein the object plane is a perspective projection plane formed by the object in the input image.

2. The image processing apparatus according to claim 1, wherein the one or more processors are further configured to:
recognize the object plane in the input image; and
calculate the transformation matrix between the recognized object plane and the isothetic plane.

3. The image processing apparatus according to claim 2, wherein the one or more processors are further configured to:
recognize the convex quadrilateral formed by the object in the input image as the object plane; and
calculate the transformation matrix between the recognized convex quadrilateral and a unit square as the isothetic plane.

4. The image processing apparatus according to claim 3, wherein the one or more processors are further configured to:
divide the input image into a plurality of areas to extract a contour of the object; and
recognize the convex quadrilateral formed by the object on the basis of the extracted contour.

5. The image processing apparatus according to claim 1, wherein the one or more processors are further configured to:
build a hierarchical structure of a plurality of the object planes;
calculate the area in the object plane as the user selected area based on the object plane that has a determined hierarchy that corresponds to the positional information specified by the user.

6. The image processing apparatus according to claim 5, wherein the one or more processors are configured to use the object plane that has a lowest level of hierarchy among the plurality of the object planes and that corresponds to the positional information specified by the user.

7. The image processing apparatus according to claim 1, wherein the one or more processors are configured to control display of the object plane that corresponds to the positional information specified by the user.

8. The image processing apparatus according to claim 7, wherein the one or more processors are configured to display the object plane that corresponds to the positional information specified by the user in accordance with area-selection specification operation by the user, and delete the object plane after passage of a determined time period.

9. The image processing apparatus according to claim 1, wherein the transformation matrix is a homography matrix and the inverse transformation matrix is a homography inverse matrix which is an inverse matrix of the homography matrix.

10. The image processing apparatus according to claim 1, wherein the one or more processors are further configured to swap a first area image as the user selected area and calculated on the basis of a first piece of the positional information, and a second area image as the user selected area and calculated on the basis of a second piece of the positional information.

11. A method of processing an image, the method comprising:
acquiring positional information specified by a user on an input image for specifying area selection, wherein the positional information comprises first two points in a diagonal direction that form a convex quadrilateral recognized in the input image based on a shape of an object in the input image; and
calculating an area of the convex quadrilateral in an object plane in the input image as a user selected area that corresponds to the positional information specified by the user, wherein calculating the area comprises:
performing coordinate transformation of the first two points based on a transformation matrix to determine second two points in an isothetic plane corresponding to the first two points in the object plane;
calculating third two points in the isothetic plane such that the second two points and the third two points form a isothetic box corresponding to the convex quadrilateral; and
inverse transforming the third two points based on an inverse transformation matrix to determine fourth two points in the object plane corresponding to the third two points, wherein the first two points and the fourth two points form the convex quadrilateral,
wherein the object plane is a perspective projection plane formed by the object in the input image.

12. A non-transitory computer readable medium having stored thereon, a set of computer-executable instructions for causing a computer to perform processing comprising:
acquiring positional information specified by a user on an input image for specifying area selection, wherein the positional information comprises first two points in a diagonal direction that form a convex quadrilateral recognized in the input image based on a shape of an object in the input image; and
calculating an area of the convex quadrilateral in an object plane in the input image as a user selected area that corresponds to the positional information specified by the user, wherein calculating the area comprises:
performing coordinate transformation of the first two points based on a transformation matrix to determine second two points in an isothetic plane corresponding to the first two points in the object plane;
calculating third two points in the isothetic plane such that the second two points and the third two points form a isothetic box corresponding to the convex quadrilateral; and
inverse transforming the third two points based on an inverse transformation matrix to determine fourth two points in the object plane corresponding to the third two points, wherein the first two points and the fourth two points form the convex quadrilateral,
wherein the object plane is a perspective projection plane formed by the object in the input image.

* * * * *